US011887200B2

(12) United States Patent
Vijaya Kumar et al.

(10) Patent No.: US 11,887,200 B2
(45) Date of Patent: Jan. 30, 2024

(54) SYSTEMS AND METHODS FOR ENABLING YIELDING DECISIONS, CONFLICT RESOLUTION, AND USER PROFILE GENERATION

(71) Applicant: GM Global Technology Operations LLC, Detroit, MI (US)

(72) Inventors: Vivek Vijaya Kumar, Shelby Township, MI (US); Upali P. Mudalige, Rochester Hills, MI (US); Syed Bilal Mehdi, Southfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 5 days.

(21) Appl. No.: 17/547,747

(22) Filed: Dec. 10, 2021

(65) Prior Publication Data
US 2023/0186416 A1 Jun. 15, 2023

(51) Int. Cl.
*G07C 5/00* (2006.01)
*H04W 4/46* (2018.01)
*G06Q 50/18* (2012.01)

(52) U.S. Cl.
CPC ........... *G06Q 50/182* (2013.01); *G07C 5/008* (2013.01); *H04W 4/46* (2018.02)

(58) Field of Classification Search
None
See application file for complete search history.

(56) References Cited

U.S. PATENT DOCUMENTS

| 8,782,121 B1 * | 7/2014 | Chang | H04L 67/104 |
| | | | 709/219 |
| 10,241,509 B1 * | 3/2019 | Fields | G05D 1/0055 |
| 2007/0043506 A1 * | 2/2007 | Mudalige | G08G 1/163 |
| | | | 701/469 |
| 2013/0057397 A1 * | 3/2013 | Cutler | G08G 1/167 |
| | | | 701/25 |

(Continued)

FOREIGN PATENT DOCUMENTS

| EP | 3838700 A1 * | 6/2021 | ............ B60W 50/10 |
| GB | 2277653 A * | 11/1994 | ............... B60Q 1/52 |

(Continued)

OTHER PUBLICATIONS

Su Xiu Xu, Meng Cheng, Xiang T.R. Kong, Hai Yang, George Q. Huang, Private parking slot sharing, Transportation Research Part B: Methodological, vol. 93, Part A, 2016, pp. 596-617, ISSN 0191-2615, https://doi.org/10.1016/j.trb.2016.08.017. (Year: 2016).*

(Continued)

*Primary Examiner* — Paul R Fisher
(74) *Attorney, Agent, or Firm* — Vivacqua Crane, PLLC

(57) ABSTRACT

A method for generating a user profile and system including a controller configured to execute instructions to execute the method. The method including determining by a user of a first vehicle that an interactive maneuver is needed to provide a resource, identifying a second vehicle to interact with, contacting a user of the second vehicle, requesting the user of the second vehicle to perform the interactive maneuver, receiving a response from the user of the second vehicle, and generating a user profile for the user of the second vehicle based on the performance of providing the resource.

20 Claims, 7 Drawing Sheets

(56) References Cited

U.S. PATENT DOCUMENTS

| | | | | |
|---|---|---|---|---|
| 2013/0268319 | A1* | 10/2013 | Palombo | G06Q 30/0283 705/7.31 |
| 2014/0195093 | A1* | 7/2014 | Litkouhi | B60W 30/18163 701/23 |
| 2016/0071418 | A1* | 3/2016 | Oshida | B60K 28/06 701/23 |
| 2016/0304097 | A1* | 10/2016 | Taira | B60W 10/20 |
| 2018/0086342 | A1* | 3/2018 | Ohsugi | B60W 30/18163 |
| 2018/0093671 | A1* | 4/2018 | Allan | B60W 30/18163 |
| 2018/0108082 | A1* | 4/2018 | Hart | G06Q 30/08 |
| 2018/0148060 | A1* | 5/2018 | Hashimoto | B60W 30/18163 |
| 2018/0335785 | A1* | 11/2018 | Miller | G08G 1/017 |
| 2019/0051159 | A1* | 2/2019 | Wang | G05D 1/0088 |
| 2019/0266489 | A1* | 8/2019 | Hu | B60W 10/20 |
| 2019/0378345 | A1* | 12/2019 | Mossoba | G06Q 20/145 |
| 2019/0389483 | A1* | 12/2019 | Likhterman | B60W 50/0098 |
| 2020/0380595 | A1 | 12/2020 | Huber | |
| 2021/0034059 | A1* | 2/2021 | Nagata | B60W 60/0015 |
| 2021/0171042 | A1* | 6/2021 | Hayakawa | B60W 30/18163 |

FOREIGN PATENT DOCUMENTS

| | | | | | |
|---|---|---|---|---|---|
| WO | WO2017205731 | A1 | * | 11/2017 | G06Q 20/00 |
| WO | WO2019164531 | A1 | * | 8/2019 | G05D 1/02 |
| WO | WO2020205597 | A1 | * | 10/2020 | B06W 60/00 |

OTHER PUBLICATIONS

Shuo-Yan Chou, Shih-Wei Lin, Chien-Chang Li, Dynamic parking negotiation and guidance using an agent-based platform, Expert Systems with Applications, vol. 35, Issue 3, 2008, pp. 805-817, ISSN 0957-4174, https://doi.org/10.1016/j.eswa.2007.07.042. (Year: 2008).*

J. Rios-Torres and A. A. Malikopoulos, "A Survey on the Coordination of Connected and Automated Vehicles at Intersections and Merging at Highway On-Ramps," in IEEE Transactions on Intelligent Transportation Systems, vol. 18, No. 5, pp. 1066-1077, May 2017 (Year: 2017).*

V. Dolk et al., "Cooperative Automated Driving for Various Traffic Scenarios: Experimental Validation in the GCDC 2016," in IEEE Transactions on Intelligent Transportation Systems, vol. 19, No. 4, pp. 1308-1321, Apr. 2018 (Year: 2018).*

* cited by examiner

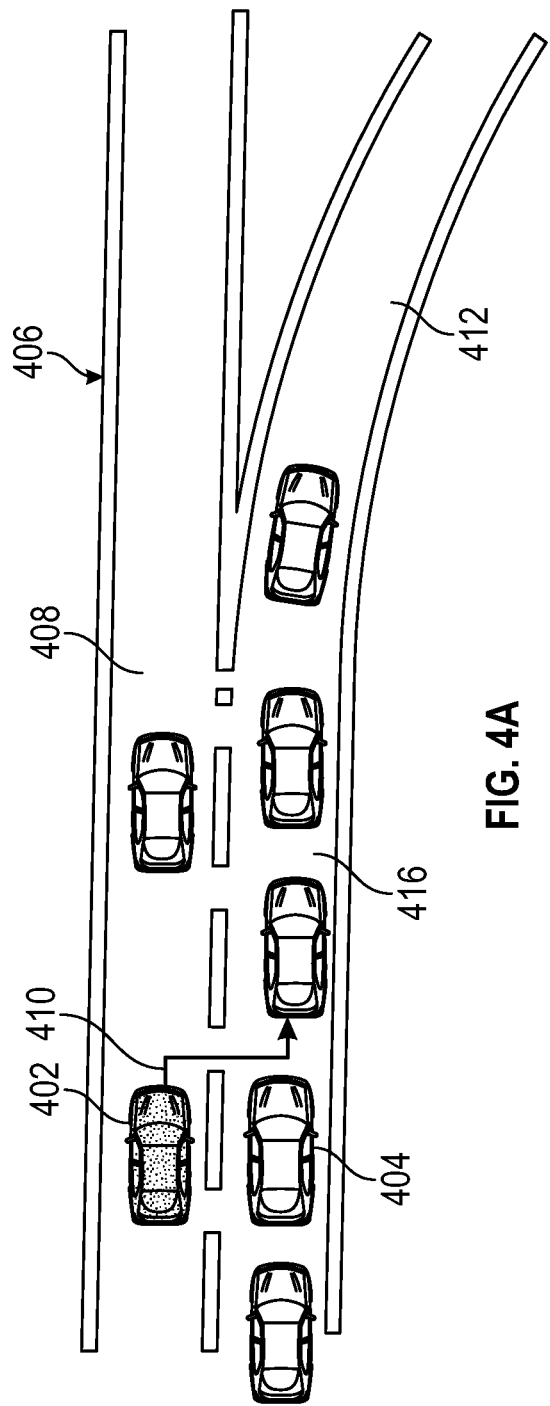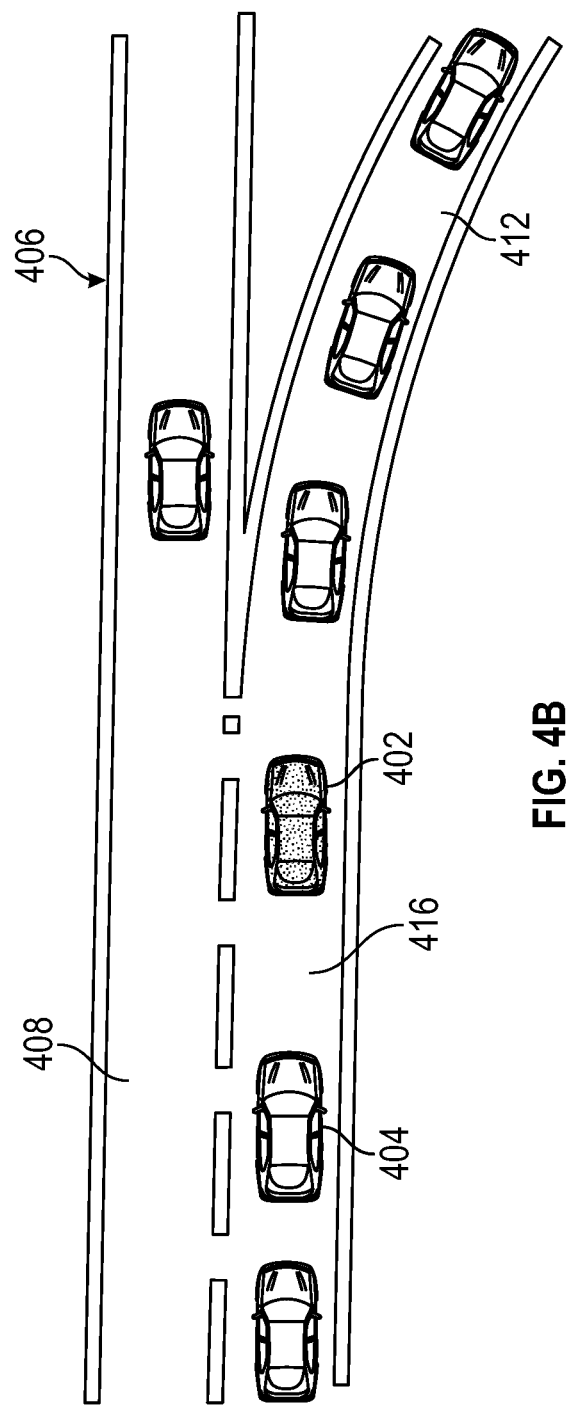

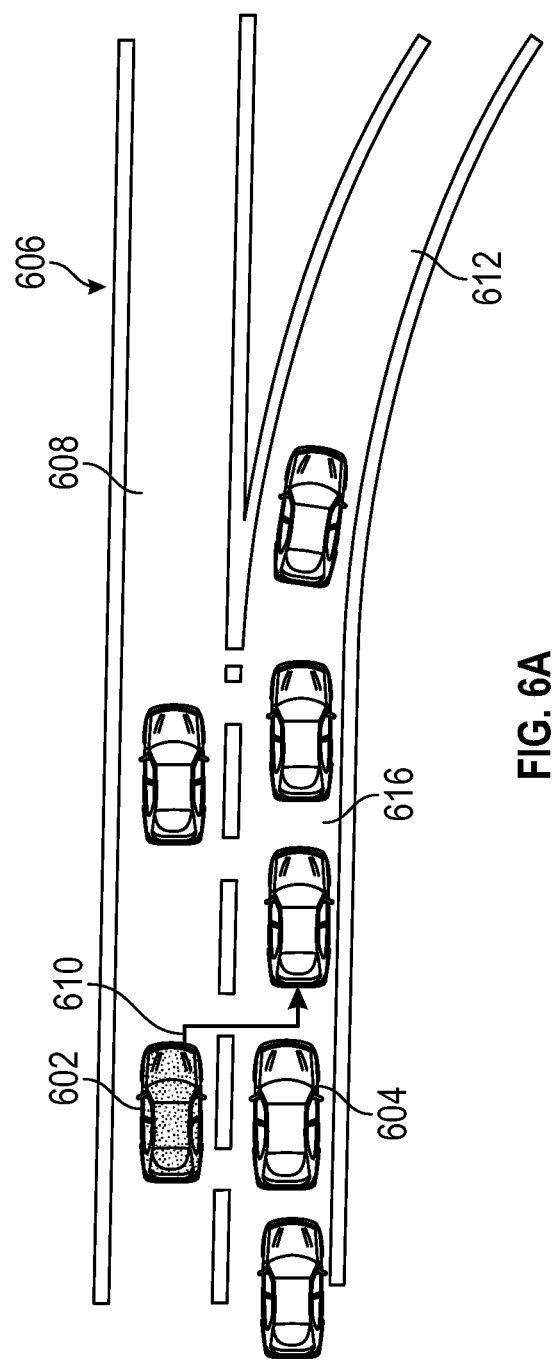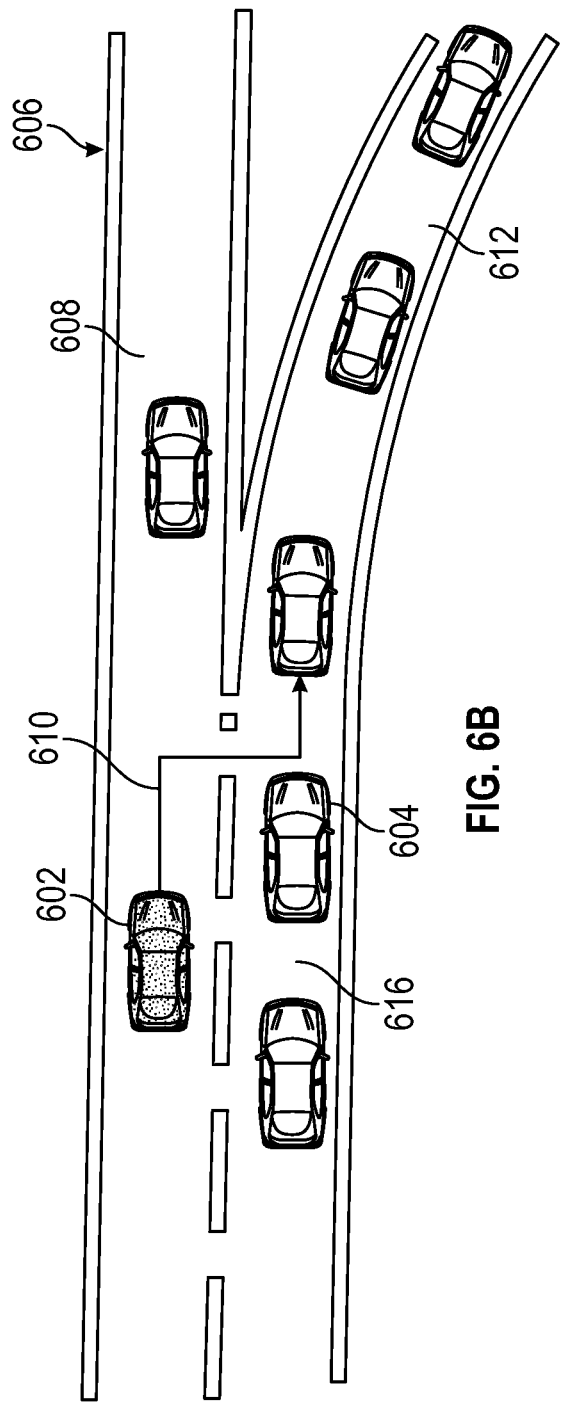
FIG. 6A
FIG. 6B

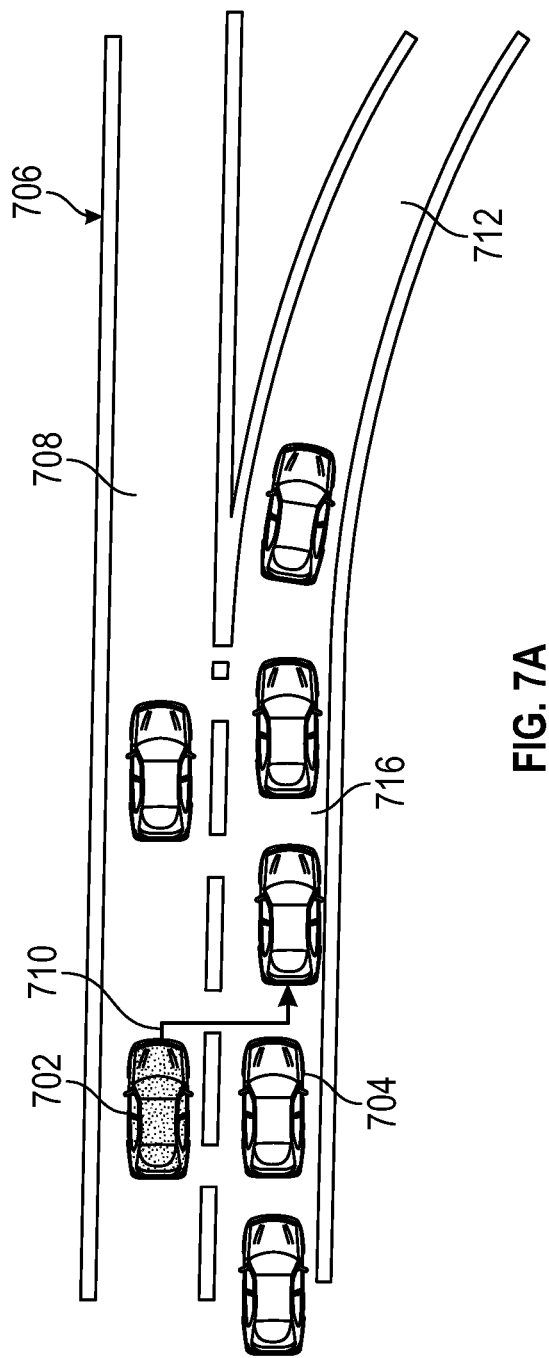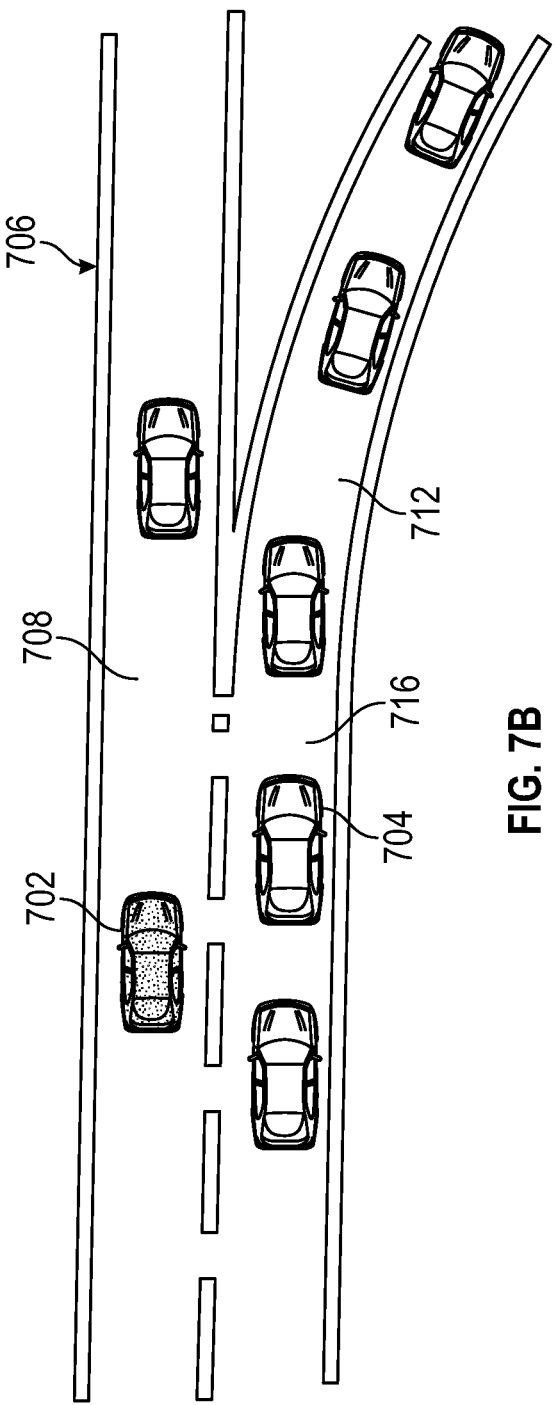

SYSTEMS AND METHODS FOR ENABLING YIELDING DECISIONS, CONFLICT RESOLUTION, AND USER PROFILE GENERATION

INTRODUCTION

The present disclosure relates systems and methods for enabling yielding decisions, facilitating conflict resolution, and generating a user profiles.

From time to time, operating a vehicle is a social task, involving interactions between two or more drivers. Interactions that occur between drivers may arise during events such as yielding at intersections, entering traffic circles, merging into an adjacent lane of traffic, entering a highway, or exiting a highway. Some of these interactions may be governed by formal traffic rules and other interactions may be informed by informal, regional customs.

Sometimes drivers are unable to communicate with each other in an efficient manner and miscommunications may occur. In some instances, miscommunication between drivers lead to inconveniences such as missing an exit ramp to leave a highway or missing a turn in crowded traffic conditions. In other instances, miscommunication may lead to complications when, for example, multiple drivers with intersecting paths of travel enter an intersection at the same time. As vehicles become more autonomous, systems for communicating between vehicles and sharing resources are being developed that may reduce the negative impact of miscommunications between drivers.

Thus, while current conventions for facilitating communication and conflict resolution between users, including drivers, autonomous vehicles, or both, achieve their intended purpose, there is a need for the development of systems and methods for further facilitating communication between users, enabling yielding decisions, assisting conflict resolution, and generating user profiles.

SUMMARY

According to several aspects of the present disclosure, a method of generating a user profile includes determining by a first user of a first vehicle that an interactive maneuver is needed to provide a resource, identifying a second vehicle to interact with, contacting a second user of the second vehicle, requesting the second user of the second vehicle to perform the interactive maneuver, receiving a response from the second user of the second vehicle, and generating a user profile for the second user based on the performance of providing the resource.

In further aspects, the method further includes offering an incentive to the second user for performing the interactive maneuver.

In additional aspects, if the received response is negative, the method further comprises increasing the incentive.

In additional aspects, the received response to perform the interactive maneuver is an affirmative response and the first user performs a maneuver.

In yet additional aspects, the method further includes determining if the first user and the second user agree that performance of the interactive maneuver was successful.

In yet further aspects, the method further includes providing the incentive to the second user.

In additional aspects, the performance of the interactive maneuver was unsuccessful, and the method further comprises providing the incentive to the second user.

In additional aspects, the method further includes acquiring data on the performance of the interactive maneuver by the second user with a sensor associated with the first vehicle.

In additional aspects, the method includes reporting the user profile of the second user to a third party.

In further aspects, the interactive maneuver includes at least one of merging in front of the second vehicle, parking in a spot occupied by the second vehicle, passing the second vehicle, proceeding in a traffic circle, and entering an intersection.

According to several aspects of the present disclosure, a system for generating a user profile, includes a controller associated with a first vehicle, the controller configured to execute instructions to: determine an interactive maneuver is needed to provide a resource, identify a second vehicle to interact with, contact a second user of the second vehicle, request the second user to perform the interactive maneuver, receive a response from the second user of the second vehicle, and generate a user profile for the second user based on the performance of providing the resource.

In further aspects, the controller is further configured to execute instructions to offer an incentive to the second user for performing the interactive maneuver.

In additional aspects, the controller is further configured to execute instructions to increase the incentive if the received response is negative.

In further aspects, when the received response to perform the interactive maneuver is an affirmative response, and the controller is further configured to execute instructions to perform a maneuver.

In yet additional aspects, the controller is further configured to determine if a first user of the first vehicle and the second user of the second vehicle agree that performance the interactive maneuver was successful.

In yet additional aspects, the controller is further configured to determine if the performance of the interactive maneuver was unsuccessful and provide the incentive to the user of the second user.

In further aspects, the controller is further configured to execute instructions to acquire data on the performance of the interactive maneuver by the second user using a sensor associated with the first vehicle.

In additional aspects, the controller is further configured to report the user profile to a third party.

In further aspects, the interactive maneuver includes at least one of merging in front of the second vehicle, parking in a spot occupied by the second vehicle, passing the second vehicle, proceeding in a traffic circle, and entering an intersection.

According to several aspects of the present disclosure, a vehicle including a system for generating a user profile includes a controller, the controller configured to execute instructions to: determine an interactive maneuver is needed to provide a resource, identify a second vehicle to interact with, contact a user of the second vehicle, request the user of the second vehicle to perform the interactive maneuver, receive a response from the second user, and generate a user profile for the second user based on the performance of providing the resource.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4A illustrates a schematic diagram of a first vehicle and a second vehicle on a roadway before an interactive maneuver occurs, according to aspects of the present disclosure;

FIG. 4B illustrates a schematic diagram of a first vehicle and a second vehicle on a roadway after an interactive maneuver occurs, according to aspects of the present disclosure;

FIG. 6A illustrates a schematic diagram of a first vehicle and a second vehicle on a roadway before an interactive maneuver occurs, according to aspects of the present disclosure;

FIG. 6B illustrates a schematic diagram of a first vehicle and a second vehicle on a roadway after an interactive maneuver does not occur, according to aspects of the present disclosure;

FIG. 7A illustrates a schematic diagram of a first vehicle and a second vehicle on a roadway before an interactive maneuver occurs, according to aspects of the present disclosure; and FIG. 7B illustrates a schematic diagram of a first vehicle and a second vehicle on a roadway after an interactive maneuver does not occur, according to aspects of the present disclosure.

DETAILED DESCRIPTION

The following description is merely exemplary in nature and is not intended to limit the present disclosure, application, or uses.

The present disclosure relates systems and methods for generating a user profile. More particularly, the present disclosure relates to systems and methods for generating a user profile through enabling yielding decisions and facilitating conflict resolution. In aspects, data regarding how driving resources, such as openings in traffic or parking spots, is compiled to facilitate future driving interactions involving the user and may be provided to one or more third parties, such as insurance companies, employers, parents, for the evaluation of drivers. The user includes for example, the driver of a vehicle, an occupant of a vehicle, or the vehicle itself, such as in an autonomous vehicle.

As alluded to above, resources include, for example, openings in traffic, spots on the road, and parking spots, as well as other locations used for operating or storing vehicles. In aspects, the resources may be available without the need for interactions to utilize the resources and in alternative aspects, the availability of a resource may need to be created through the movement of a second vehicle out of the resource location. The need for the second vehicle to move to make the resource available creates the need for an interactive maneuver where the second vehicle is moved from the resource making the resource available for the first vehicle. It should be appreciated that in some instances, more than two vehicles may be involved in an interactive maneuver, such three or more vehicles.

Figure 1:
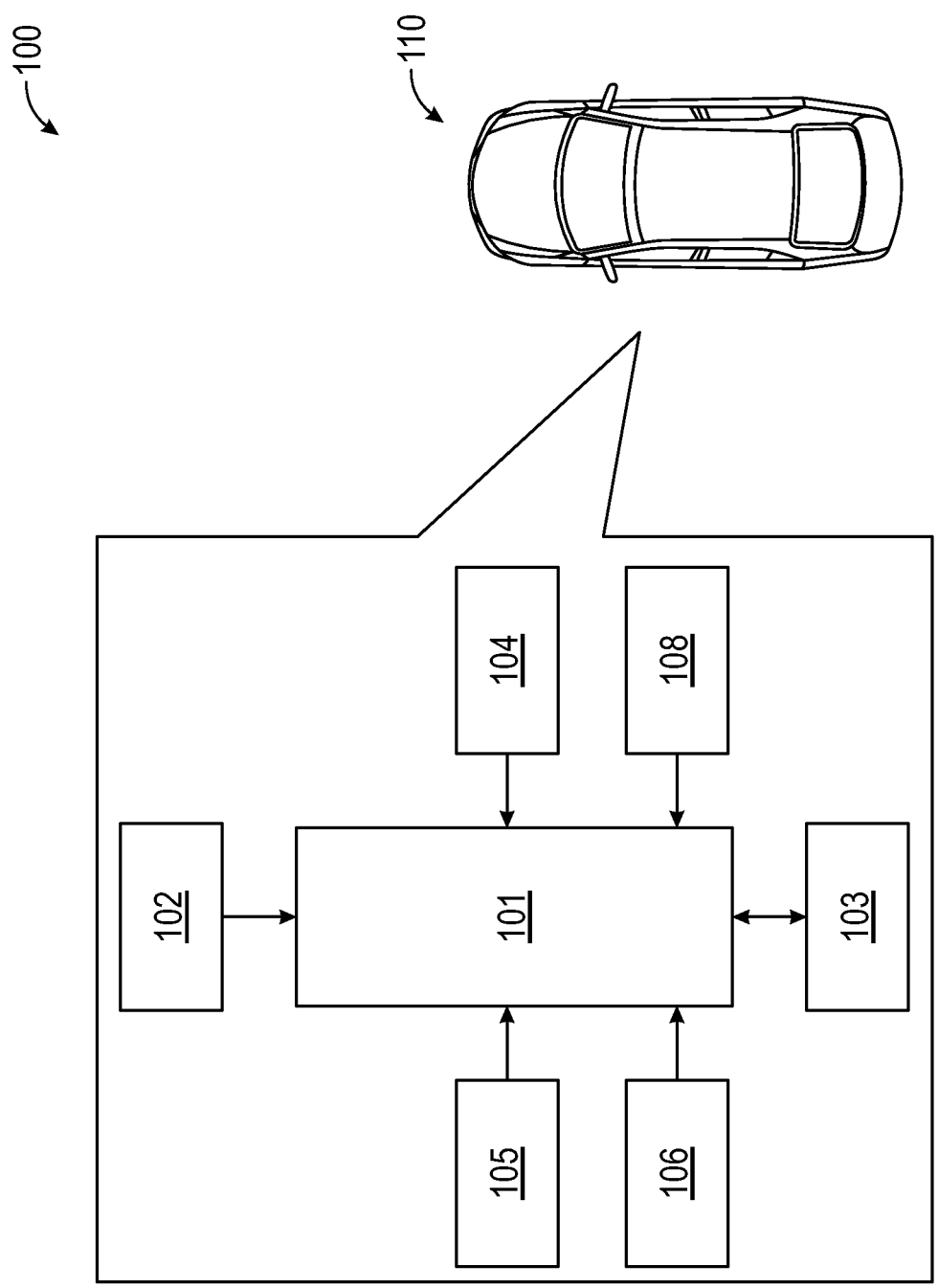
FIG. 1 illustrate a schematic diagram of a vehicle including a system for executing a method of generating a user profile based on vehicle interactions, according to aspects of the present disclosure.

Referring now to FIG. 1, a schematic diagram is presented illustrating a system 100 for executing a method of generating a user profile. The system 100, according to several aspects, includes a controller 101, a power supply 102, a storage 103, an output 104, sensors 105, and a communication device 108. However, the system 100 is not limited to the aforementioned configuration and may be configured to include additional elements and/or omit one or more of the aforementioned elements. As illustrated, the system 100 is implemented as part of a vehicle 110. Alternatively, the system 100 is otherwise associated with a vehicle 110 as a standalone component which may be removably coupled to a vehicle 110 or operated remotely in communication with the vehicle 110. Vehicles, in aspects, include cars, trucks, motorcycles, carts, or other apparatus for transporting people or goods.

The controller 101 controls the overall operation and function of the system 100. In aspects, the controller 101 controls one or more of a storage 103, an output 104, sensors 105, and a communication device 108 of the system 100. In further aspects, the controller 101 includes, for example, a processor, a microprocessor, a central processing unit (CPU), a graphics processor, Application Specific Integrated Circuits (ASICs), Field-Programmable Gate Arrays (FPGAs), a digital, analog, or mixed analog/digital discrete circuit, a digital, analog, or mixed analog/digital integrated circuit, a combinational logic circuit, state machines, circuitry, a processor circuit (shared, dedicated, or group) that executes code, a memory circuit (shared, dedicated, or group) that stores code executed by the processor circuit; other suitable hardware components that provide the described functionality, or a combination of some or all of the above, such as in a system-on-chip.

The power supply 102 provides power to one or more of the controllers 101, the storage 103, the output 104, sensors 105, and the communication device 108 of the system 100. In aspects, the power supply 102 includes, for example, a battery, an outlet, a capacitor, a solar energy cell, a generator, a wind energy device, an alternator, etc.

The storage 103 is configured for storing information and retrieving information used by the system 100. The storage 103 may be controlled by the controller 101 to store and retrieve information such as one or more from among driving and situation resource information and occupant preference information. In aspects, the storage 103 includes the computer instructions configured to be executed by a processor to perform and execute the functions of the system 100. The storage 103 includes, for example, a computer readable medium (also referred to as a processor readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

In aspects, the output 104 provides information to a user in one or more forms including visual, audible and/or haptic form. In further aspects, the output 104 is controlled by the controller 101 to provide outputs to the user of the system 100. The output 104 may include one or more from among a speaker, a display, a transparent display, a centrally-located display, a head up display, a windshield display, a haptic feedback device, a vibration device, a tactile feedback device, a tap-feedback device, a holographic display, an instrument light, an indicator light, etc. The output 104 may output a notification including one or more from among an audible notification, a light notification, and a display notification. The notification or output may include information regarding a driving resource being offered, acceptance of an offer, acceptance of a bid for an offered driving resource.

One or more sensors 105 are configured to provide information to the system 100. The sensors include, in aspects, cameras, lidars, radars, ultrasonic sensor, vehicle speed sensors, vehicle system sensors, a battery charge level sensor, V2X based sensors, etc. In further aspects, the controller 101 processes the information provided by the sensors 105 to make the various determinations and assessments for executing the methods described herein.

In aspects, the communication device 108 includes one or more interface circuits. In some examples, the interface circuits include wired or wireless interfaces that are connected to a local area network (LAN), the Internet, a wide area network (WAN), cellular networks or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module, which in aspects, is present in the vehicle.

The controller 101 is configured to send and/or receive information from one or more of the storage 103, the output 104, sensors 105, and the communication device 108 of the system 100. The information may be sent and received via a bus or network or may be directly read or written to/from one or more of the storage 103, the output 104, sensors 105, and the communication device 108 of the system 100. Examples of suitable network connections include a controller area network (CAN), a media oriented system transfer (MOST), a local interconnection network (LIN), a local area network (LAN), and other appropriate connections such as Ethernet.

Figure 2:
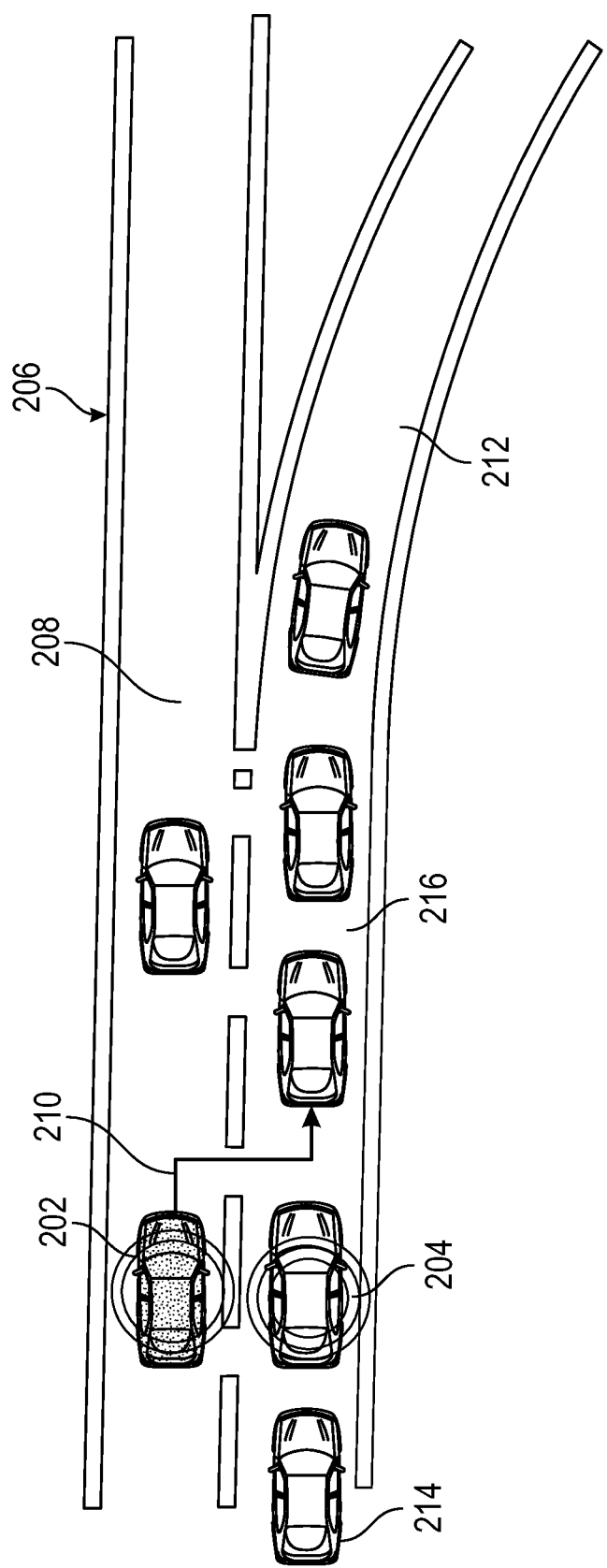
FIG. 2 illustrates a schematic diagram of a first vehicle and a second vehicle on a roadway, according to aspects of the present disclosure.
Figure 3A:
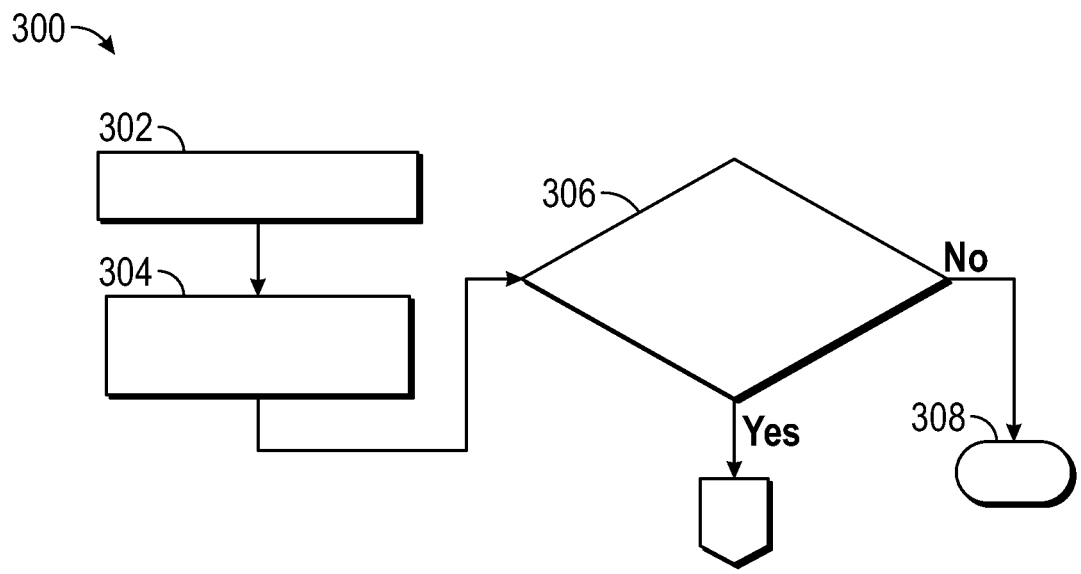
FIG. 3A illustrates a portion of a flow diagram describing a method of generating a user profile, according to aspects of the present disclosure.
Figure 3B:
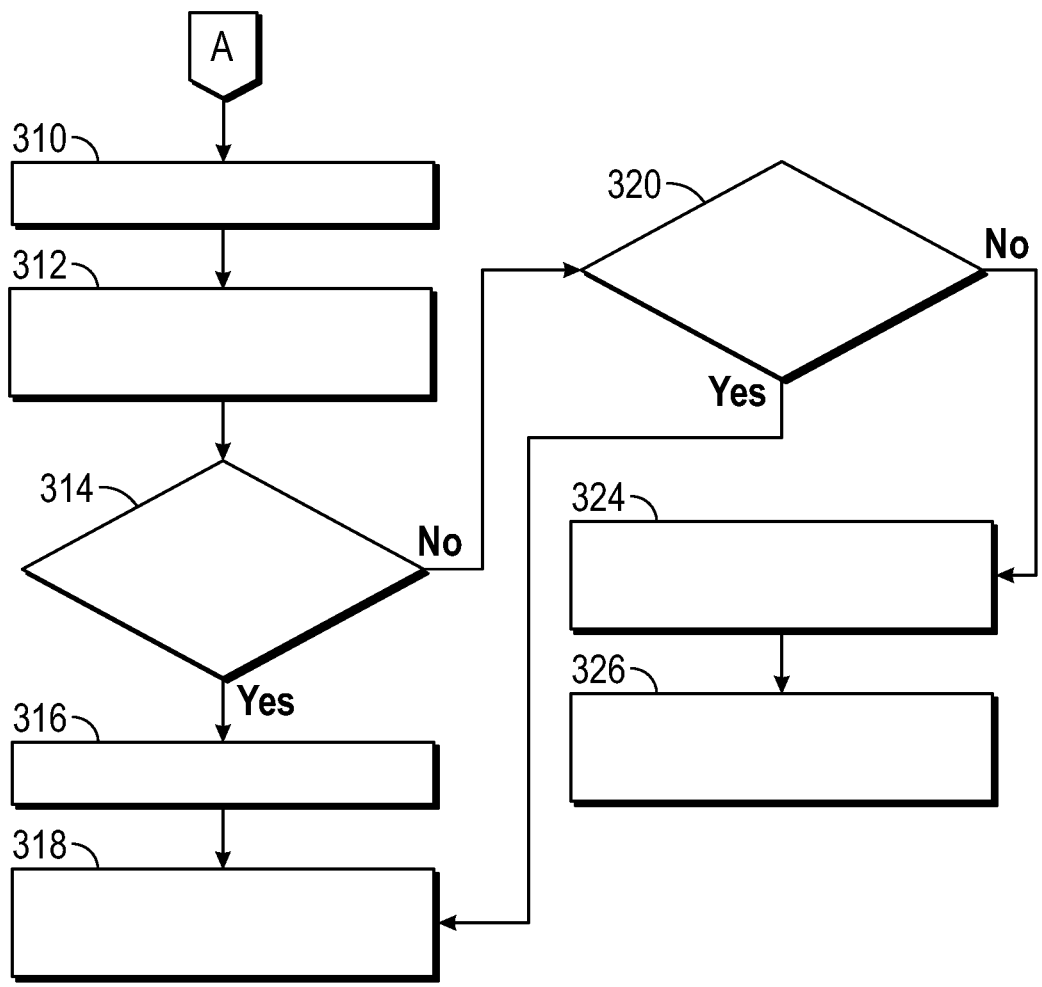
FIG. 3B illustrates the remaining portion of the flow diagram of FIG. 3A, according to aspects of the present disclosure.

Several scenarios are provided herein to describe a method of generating a user profile, an aspect of which is illustrated in FIGS. 3A and 3B. Reference is now made to FIGS. 2, 3A and 3B. FIG. 2 is an illustration of a first vehicle 202 traveling in a first lane of travel 208 on a roadway 206. FIGS. 3A and 3B illustrate a method 300 of generating a user profile, which method is executable as instructions by the controller 101 in a system 100, as described above and associated with the first vehicle 202.

At block 302, the first user of the first vehicle 202 has determined that a maneuver 210, such as a lane change, is needed to access an off ramp 212 located in an adjacent lane 216. In aspects, the determination of a necessity to make a maneuver such as accessing an off-ramp is based on the proximity to the destination, reduction of time to destination, an identified need or desire to stop the vehicle, etc. Other maneuvers that may be performed by the first user of the first vehicle include passing a vehicle, entering a lane of traffic, entering an on-ramp, entering an off-ramp, occupying a parking space, etc.

At block 304 the first vehicle 202 uses perception, such as one or more sensors 105, and communication, provided by the communication device 108, to identify a second vehicle, such as second vehicle 204 to interact with. One or more factors are considered in identifying a second vehicle to interact with. For example, in aspects, a determination is made as to whether the second vehicle 204 is associated with a system 100 for generating a user profile as described with reference to FIG. 1. Alternatively, the second vehicle 204 may include a communication device 108; however, it may not have stored in a controller 101 and system 100 similar instructions for executing the method described herein. Another factor is whether the second vehicle 204 is located in a position in which the interactive maneuver may be successfully performed. A further factor in identifying a second vehicle 204 at block 304 includes determining whether the second user of the second vehicle 204 has a favorable user profile, such as a user profile that is ranked above a threshold value of following through with agreed upon interactive maneuvers in a safe manner. The methods of generating these records are discussed further herein. Further, it should be appreciated, that in aspects only one, or more than one, second vehicle 204, 214 may be identified for interaction purposes.

Due to the presence of vehicles 204, 214 in the adjacent lane of travel 216, it is determined at block 306 whether an interactive maneuver, a maneuver involving the second vehicle 204, needs to be performed to free up a resource, such as a spot in traffic, for the first vehicle 202. If an interactive maneuver is not necessary and the second vehicle 204 does not need to alter its course of travel to make way for the first vehicle 202, then no interactions occur, the maneuver is made by the first vehicle 202, and the method ends at block 308. It should be appreciated that other interactive maneuvers may include those noted above, such as freeing up a parking spot or moving out of a lane of traffic.

If an interactive maneuver is determined to be necessary to free up a resource, i.e., a spot in traffic, then at block 310 the first user of the first vehicle 202 contacts the second vehicle 204 and requests the second user of the second vehicle 204 to perform the interactive maneuver. In this case, the second vehicle 204 must decelerate or accelerate to create the opening in the flow of traffic.

In aspects, when the first vehicle 202 contacts the second vehicle 204 at block 310, the first user of the first vehicle 202 may incentivize the response provided by the second user of the second vehicle 204 by offering an incentive for allowing the interactive maneuver to occur. Incentives include, for example, one or more of the following: a digital gift, coupon, money, gift cards, and positive user ratings. In aspects, the value of the incentive may be any value, including no value. Incentives further include positive user ratings in rewarding the performance of the second vehicle 204 as discussed further below. However, incentives and rewards are not all positive and, in aspects, may be neutral or negative, including negative user ratings or neutral user ratings. In aspects, in addition to data collected by sensors 105 while performing maneuvers, ratings may be used by companies to evaluate drivers or used by insurance companies to set rates for customers. If more than one second vehicle 204, 214 may perform the interactive maneuver, the incentive may be auctioned to the vehicles 204, 214.

In aspects, the offer of an incentive by the first user of the first vehicle 202 is predicated upon a condition. Such conditions include, in further aspects, one or more the following conditions: the first user of the first vehicle 202 deeming the interactive maneuver essential for completing a route, the first user of the first vehicle 202 deeming the interactive maneuver reducing the estimated to time a destination by a minimum threshold value, the prompting of a first user of the first vehicle 202, the prompting of a first user of the first vehicle 202 if a particular criterion is met such as the previously mentioned conditions, and a combination thereof. Further, in aspects, the incentive offered may be adjusted up to a maximum value if the initial and subsequent offers are met with a negative response and rejected.

At block 312, a response is received from the second user of the second vehicle 204. In aspects, the response is automatically generated by the controller 101 associated with the second vehicle 204. In alternative aspects, the response is manually generated by the second user of the second vehicle 204, wherein the second user of the second vehicle 204 provides an indicator of whether the interactive maneuver is acceptable. If the second vehicle 204 does not accept the request to perform an interactive maneuver within a given time period, the response is negative, or both, the method ends, and no further action is taken. Acceptance of the request may be predicated upon the first user of the first vehicle 202 offering of an incentive at block 310 or the first user of the first vehicle 202 offering an incentive that meets a given criterion, such as the offering of an incentive of a value over a threshold amount. In further aspects, if the given criterion is met, the user may be prompted to accept or decline the request. And, in yet further aspects, the request may only be accepted if the second user of the second vehicle 204 has not indicated that the current drive is an urgent or critical drive.

If, at block 312, the second user of the second vehicle 204 accepts the request, and the received response is affirmative, then the first user of the first vehicle 202 and the second user of the second vehicle 204, assuming the second vehicle 204 is similarly equipped, record data obtained through the sensors 105 associated with each vehicle 202, 204. The data includes various measurements taken by the first vehicle 202 and the second vehicle 204 including the speed of travel at the initiation and conclusion of the interactive maneuver, changes in acceleration, distances each vehicle travels in both the direction of travel and cross-lane direction, as well as whether the interactive maneuver was successfully accomplished, and the resource was allocated to the first vehicle 202.

At block 314, a determination is made as to whether the first user of the first vehicle 202 and the second user of the second vehicle 204 agrees the interactive maneuver was successful and the resource was allocated. If it is determined that an agreement is reached that the interactive maneuver was successful and the resource was allocated, the first user of the first vehicle 202 provides the offered incentive to the second user of the second vehicle 204 at block 316 if an incentive was offered. The determination may be made by using sensor 105 data onboard the first vehicle 202, the second vehicle 204, or a combination of both vehicles 202, 204.

In aspects, algorithms on the vehicles are used to determine whether the interactive maneuver was successful at block 314, and the resource allocated. If the probability of a successful interactive maneuver calculated by each vehicle exceeds a threshold, then the vehicles 202, 204 declare the interactive maneuver successful. If the probability of a successful interactive maneuver calculated by each vehicle is in a range proximal to the threshold, then the first user of the first vehicle 202 is prompted to indicate whether the interactive maneuver was successful. In further aspects, if the first vehicle 202 calculates the interactive maneuver was unsuccessful at block 314, the first user of the first vehicle 202 is prompted to confirm. In yet further aspects, the first vehicle 202 is configured to assume that the interactive maneuver is successful. And, in yet further aspects, the second vehicle 204 is configured to assume that the interactive maneuver is unsuccessful. In additional aspects, a combination of the above may occur.

Regardless of whether an incentive was offered, at block 318, the first user of the first vehicle 202 assesses the performance of the interactive maneuver by the second vehicle 204. The data collected by each vehicle 202, 204 from the sensors 105 associated with each vehicle 202, 204 is shared between the vehicles, in some aspects. And in further aspects, the data is shared by the second vehicle 204 with the first user of the first vehicle 202. The second user of the second vehicle 204 is rewarded safety information by the first user of the first vehicle 202. Rewarding a user includes recognition of the behavior of the user, including the willingness of a user to perform an interactive maneuver, how the maneuver is performed, whether an incentive is provided or accepted, etc. In aspects, the safety information includes whether safe distances and speeds were used in performing the interactive maneuver by the second vehicle 204 and the responsiveness of the second vehicle 204 to the request for an interactive maneuver made by the first vehicle 202. This information is also used to generate a user profile for the second user of the second vehicle 204 including the willingness of the second vehicle 204 to perform interactive maneuvers, the threshold incentives that the second user of the second vehicle 204 is seeking to affirmatively respond to, and the safety habits of the second vehicle 204. In further aspects, user profile for the second user of the second vehicle 204 is saved for later either onboard the vehicle in storage 103, uploaded to a server or both, and is shared with one or more third parties, including, for example, one or more of the following insurance companies, educators, employers, and parents.

In further aspects, at block 318 the second user of the second vehicle 204 also assesses the performance of the interactive maneuver by the first vehicle 202 data generated by the second vehicle 204 and, in aspects, shared by the first vehicle 202. In aspects, the assessment occurs in the systems 100 on-board first vehicle 202 or, alternatively or additionally, the assessment occurs in systems 100 operated remotely from the first vehicle 202 and the data is uploaded to remote servers. The first user of the first vehicle 202 is rewarded safety information by the second user of the second vehicle 204. In aspects, the safety information includes whether safe distances and speeds were used in performing the interactive maneuver by the first vehicle 202 and the responsiveness of the first vehicle 202 to the request for an interactive maneuver made by the first vehicle 202. This information is also used to generate a user profile for the second user of the second vehicle 204 including the willingness of the second vehicle 204 to perform interactive maneuvers, the threshold incentives that the second user of the second vehicle 204 is seeking to affirmatively respond to, and the safety habits of the second vehicle 204. In further aspects, user profile for the second user of the second vehicle 204 is saved for later either onboard the vehicle in storage 103, uploaded to a server or both, and is shared with one or more third parties, including, for example, one or more of the following insurance companies, educators, employers, and parents.

If at block 314 an agreement is not reached that the interactive maneuver was successful, at block 320 a determination is made as to whether an agreement is reached between the first user of the first vehicle 202 and the second user of the second vehicle 204 that the interactive maneuver was not successfully performed, and the resource was not allocated. In aspects, the data collected by each vehicle 202, 204 from the sensors 105 associated with each vehicle 202, 204 is shared between the vehicles 202, 204. And in further aspects, the data is shared with the first user of the first vehicle 202 by the second user of the second vehicle 204.

If an agreement is reached at block 320 that the interactive maneuver was unsuccessful, the method returns to block 318 and the first user of the first vehicle 202 assesses the performance of the interactive maneuver by the second user of the second vehicle 204. The second user of the second vehicle 204 is rewarded safety information by the first user of the first vehicle 202. In aspects, the safety information includes whether safe distances and speeds were used in performing the interactive maneuver by the second user of the second vehicle 204 and the responsiveness of the second user of the second vehicle 204 to the request for an interactive maneuver made by the first vehicle 202. In aspects, this data is saved for later and is shared with one or more third parties, including, for example, one or more of the following insurance companies, educators, employers, and parents. This information is also used to generate a user profile for the second user of the second vehicle 204 including the willingness of the second user of the second vehicle 204 to perform interactive maneuvers, the threshold incentives that the second user of the second vehicle 204 is seeking to affirmatively respond to request for interactive maneuvers, and the safety habits of the second vehicle 204.

In further aspects, at block 318 the second user of the second vehicle 204 also assesses the performance of the interactive maneuver by the first vehicle 202 data generated by the second vehicle 204 and, in aspects, shared by the first vehicle 202. In aspects, the assessment occurs in the systems 100 on-board second vehicle 204 or, alternatively or additionally, the assessment occurs in systems 100 operated remotely from the second vehicle 204 and the data is uploaded to remote servers. The first user of the first vehicle 202 is rewarded safety information by the second user of the second vehicle 204. In aspects, the safety information includes whether safe distances and speeds were used in performing the interactive maneuver by the first vehicle 202 and the responsiveness of the first vehicle 202 to the request for an interactive maneuver made by the first vehicle 202. This information is also used to generate a user profile for the second user of the second vehicle 204 including the willingness of the second vehicle 204 to perform interactive maneuvers, the threshold incentives that the second user of the second vehicle 204 is seeking to affirmatively respond to, and the safety habits of the second vehicle 204. In further aspects, user profile for the second user of the second vehicle 204 is saved for later either onboard the vehicle in storage 103, uploaded to a server or both, and is shared with one or more third parties, including, for example, one or more of the following insurance companies, educators, employers, and parents.

If an agreement was not reached at block 320, at block 324, the first user of the first vehicle 202 determines at block 320 whether or not it will provide the second user of the second vehicle 204 with the incentive if an incentive was offered at block 310. Then, at block 326, the first user of the first vehicle 202 assesses the performance by the second user of the second vehicle 204. In aspects, the assessment occurs in the systems 100 on-board first vehicle 202 or, alternatively or additionally, the assessment occurs in systems 100 operated remotely from the first vehicle 202 and the data is uploaded to remote servers. The second user of the second vehicle 204 is rewarded safety information by the first user of the first vehicle 202. In aspects, the safety information includes whether safe distances and speeds were used in performing the interactive maneuver by the second user of the second vehicle 204 and the responsiveness of the second user of the second vehicle 204 to the request for an interactive maneuver made by the first vehicle 202. This information is used to generate a user profile for the second user of the second vehicle 204 including the willingness of the second user of the second vehicle 204 to perform interactive maneuvers, the threshold incentives that the second user of the second vehicle 204 is seeking to affirmatively respond to request for interactive maneuvers, and the safety habits of the second user of the second vehicle 204. In aspects, this information and user profile is saved for later and is shared with one or more third parties, including, for example, one or more of the following insurance companies, educators, employers, and parents.

In further aspects, at block 326 the second user of the second vehicle 204 also assesses the performance of the interactive maneuver by the first vehicle 202 data generated by the second vehicle 204 and, in aspects, shared by the first vehicle 202. In aspects, the assessment occurs in the systems 100 on-board second vehicle 204 or, alternatively or additionally, the assessment occurs in systems 100 operated remotely from the second vehicle 204 and the data is uploaded to remote servers. The first user of the first vehicle 202 is rewarded safety information by the second user of the second vehicle 204. In aspects, the safety information includes whether safe distances and speeds were used in performing the interactive maneuver by the first vehicle 202 and the responsiveness of the first vehicle 202 to the request for an interactive maneuver made by the first vehicle 202. This information is also used to generate a user profile for the second user of the second vehicle 204 including the willingness of the second vehicle 204 to perform interactive maneuvers, the threshold incentives that the second user of the second vehicle 204 is seeking to affirmatively respond to, and the safety habits of the second vehicle 204. In further aspects, user profile for the second user of the second vehicle 204 is saved for later either onboard the vehicle in storage 103, uploaded to a server or both, and is shared with one or more third parties, including, for example, one or more of the following insurance companies, educators, employers, and parents.

The determination of whether an agreement between the first user of the first vehicle 202 and the second user of the second vehicle at block 320 includes, in aspects, using sensors 105 onboard the first vehicle 202 and second vehicle 204 and algorithms that analyze the data provided by the sensors to determine if the interactive maneuver was unsuccessful. If the probabilities calculated by each vehicle 202, 204 are both greater than a threshold, it is determined that interactive maneuver was unsuccessful. In further aspects, if the probability of a successful interactive maneuver calculated by each vehicle 202, 204 is in a range proximal to the threshold, then the user is prompted to indicate whether the interactive maneuver was unsuccessful. In further aspects, if the first vehicle 202 calculates the interactive maneuver was unsuccessful, the user is prompted to confirm. In alternative or additional aspects, the first vehicle 202 is programmed to always assume the merger was successful, the second vehicle 204 is programmed to always assume the merger was unsuccessful, or the first vehicle 202 is programmed to always assume the merger was successful and the second vehicle 204 is programmed to always assume the merger was unsuccessful. And, in additional aspects, a combination of the above may occur.

With reference now to FIGS. 4A and 4B, which illustrate an aspect of an initiated and successfully completed interactive maneuver, and FIGS. 3A and 3B. In FIG. 4A, at block 310 the first user of the first vehicle 402 determines that a maneuver 410, moving into an adjacent lane 416 to the current lane of travel 408 in a roadway 406, is needed to use an up-coming off ramp 412. The first vehicle 402 identifies a second vehicle 404 to interact with at block 304. At block 306 it is determined that an interactive maneuver is necessary with the second vehicle 404 to free up a resource, i.e., a spot in traffic in the adjacent lane 416. At block 310, the first user of the first vehicle 402 requests the second user of the second vehicle 404 to perform an interactive maneuver to obtain a resource, a spot in traffic in the adjacent lane 416 and incentivizes the second user of the second vehicle 404 with a positive user rating for performing the interactive maneuver. The second user of the second vehicle 404 accepts the request with the incentive at block 312 and the interactive maneuver is initiated. At block 314 a determination is made that both the first user of the first vehicle 402 and second user of the second vehicle 404 agree that the interactive maneuver was successfully completed and that the resource, a spot in traffic, was successfully allocated to the first vehicle 402. At block 316, the first user of the first vehicle 402 provides the incentive to the second user of the second vehicle 404. At block 318, the first vehicle 402 assesses how safely the second user of the second vehicle 404 performed the safety maneuver and rewards the second user of the second vehicle 404 with a corresponding safety report and generates a user profile, which may be shared with one or more third parties.

Figures 5A, 5B:
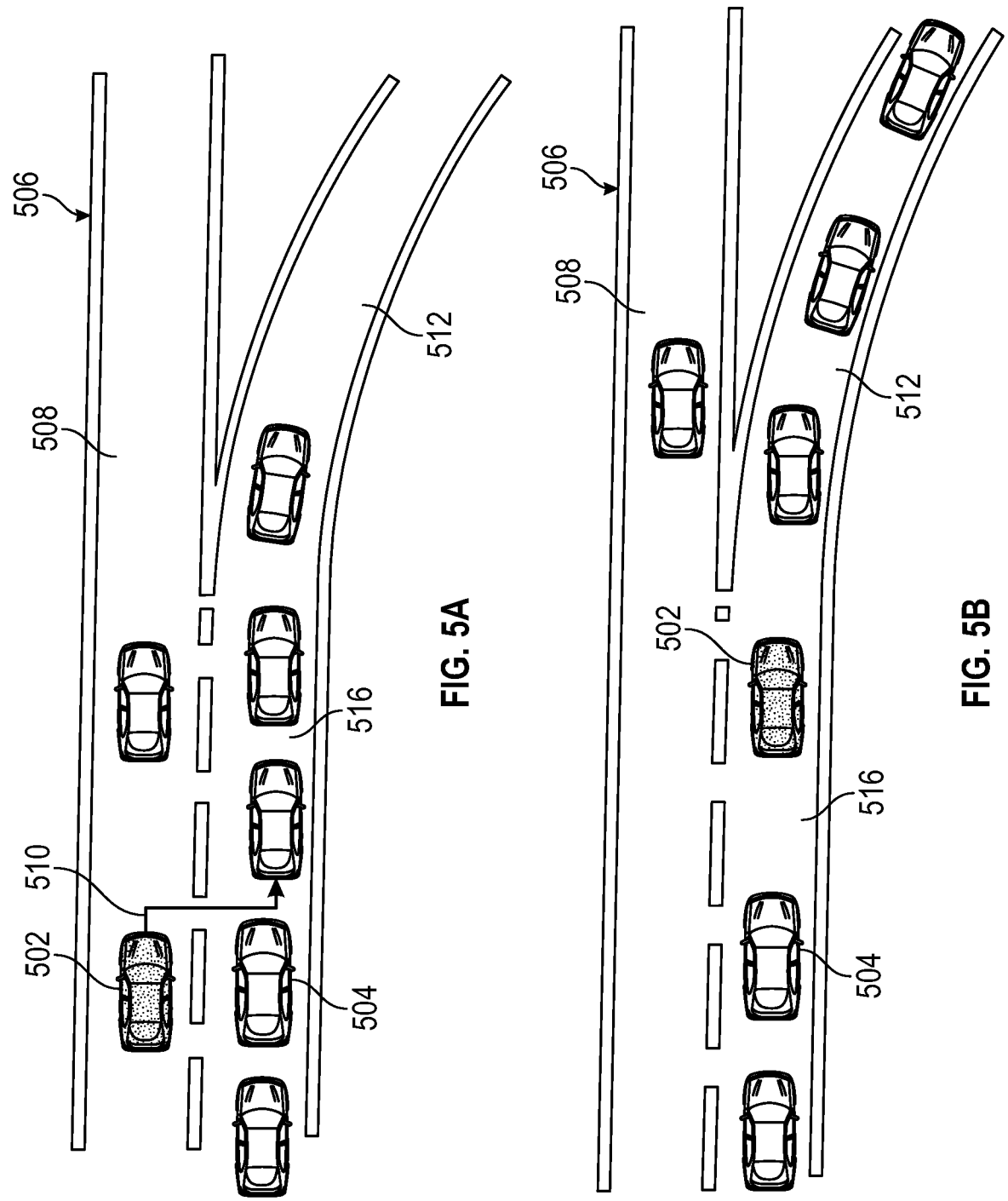
FIG. 5A illustrates a schematic diagram of a first vehicle and a second vehicle on a roadway before an interactive maneuver occurs, according to aspects of the present disclosure.
FIG. 5B illustrates a schematic diagram of a first vehicle and a second vehicle on a roadway after an interactive maneuver occurs, according to aspects of the present disclosure.

In further aspects, at block 318 the second vehicle 404 assesses how safely the first user of the first vehicle 402 performed the safety maneuver and rewards the first user of the first vehicle 402 with a corresponding safety report and generates a user profile, which may be shared with one or more third parties Reference is now made to FIGS. 5A and 5B which illustrate an aspect of an initiated and successfully completed interactive maneuver after the offer of an incentive, and FIGS. 3A and 3B. In FIG. 5A, at block 310 the first user of the first vehicle 502 determines that a maneuver 510, moving into an adjacent lane 516 to the current lane of travel 508 on a roadway 506, is needed to use an up-coming off ramp 512. The first user of the first vehicle 502 identifies a second vehicle 504 to interact with at block 304. At block 306 a determination is made that an interactive maneuver is necessary with the second vehicle 504 to free up a resource, i.e., a spot in traffic in the adjacent lane 516. At block 310, the first user of the first vehicle 502 requests the second user of the second vehicle 504 to perform an interactive maneuver to obtain a resource, a spot in traffic in the adjacent lane 516, initially without offering an incentive. The second user of the second vehicle 504 refuses the offer at block 312 and the request is repeated at block 310 by the first user of the first vehicle 502, this time with an incentive, such as a monetary incentive. The first user of the first vehicle 502 receives a response that the second user of the second vehicle 504 accepts the request at block 312 and the interactive maneuver is initiated. At block 314 a determination is made that both the first user of the first vehicle 502 and the second user of the second vehicle 504 agree that the interactive maneuver was successfully completed and that the resource, a spot in traffic, was successfully allocated to the first vehicle 502. At block 316, user of the first vehicle 502 provides the incentive to the second vehicle 504. At block 318, the first vehicle 502 assesses how safely the second vehicle 504 performed the safety maneuver, rewards the second user of the second vehicle 504 with a corresponding safety report as well as information on the second user of the second vehicle's 504 willingness to interact with the first vehicle 502 and at what price, and generates a user profile for the second user of the second vehicle 504, which may be shared with one or more third parties.

In further aspects, at block 318, the second vehicle 504 assesses how safely the first vehicle 502 performed the safety maneuver, rewards the first user of the first vehicle 502 with a corresponding safety report as well as information on the first user of the first vehicle's 502 willingness to interact with the second vehicle 504 and at what price, and generates a user profile for the first user of the first vehicle 502, which may be shared with one or more third parties.

With reference now to FIGS. 6A and 6B, which illustrate an aspect of an initiated and unsuccessfully completed interactive maneuver, and FIGS. 3A and 3B, at block 310 the first user of the first vehicle 602 determines that a maneuver 610, moving into an adjacent lane 616 to the current lane of travel 608 on a roadway 606, is needed to use an up-coming off ramp 612. The first vehicle 602 identifies a second vehicle 604 to interact with at block 304. At block 306 it is determined that an interactive maneuver is necessary with the second vehicle 604 to free up a resource, i.e., a spot in traffic in the adjacent lane 616.

At block 310, the first user of the first vehicle 602 requests the second user of the second vehicle 604 to perform an interactive maneuver to obtain a resource, a spot in traffic in the adjacent lane 616 and incentivizes the second user of the second vehicle 604 with a monetary gift for performing the interactive maneuver. The second user of the second vehicle 604 accepts the request with the incentive at block 312, the first user of the first vehicle 602 receives a response accordingly and the interactive maneuver is initiated.

At block 314 a determination is made that the first user of the first vehicle 602 and the second user of the second vehicle 604 do not agree that the interactive maneuver was successfully completed and that the resource, a spot in traffic, was successfully allocated to the first vehicle 602. At block 320, a determination is made that the first user of the first vehicle 602 and the second user of the second vehicle 604 agree that the interactive maneuver was unsuccessful. At block 318, the first user of the first vehicle 602 assesses the willingness of the second user of the second vehicle 604 to perform the interactive maneuver, rewards the second vehicle 604 with a corresponding report, and generates a second user profile, which may be shared with one or more third parties. If the maneuver was initiated, the report may further include safety information.

In further aspects, at block 318, the second user of the second vehicle 604 assesses the willingness of the first user of the first vehicle 602 to perform the interactive maneuver, rewards the first vehicle 602 with a corresponding report, and generates a first user profile, which may be shared with one or more third parties. If the maneuver was initiated, the report may further include safety information.

With reference now to FIGS. 7A and 7B, which illustrate an aspect of an initiated and unsuccessfully completed interactive maneuver where there is a disagreement as to whether an interactive maneuver was successfully performed, and FIGS. 3A and 3B. At block 310 the first user of the first vehicle 702 determines that a maneuver 710, moving into an adjacent lane 716 to the current lane of travel 708 on a roadway 706, is needed to use an up-coming off ramp 712. The first vehicle 702 identifies a second vehicle 704 to interact with at block 304. At block 306 it is determined that an interactive maneuver is necessary with the second vehicle 704 to free up a resource, i.e., a spot in traffic in the adjacent lane 716.

At block 310, the first user of the first vehicle 702 requests the second user of the second vehicle 704 to perform an interactive maneuver to obtain a resource, a spot in traffic in the adjacent lane 716 and incentivizes the second user of the second vehicle 704 with a monetary gift for performing the interactive maneuver. In this example, the second user of the second vehicle 704 accepts the request with the incentive at block 312, the first user of the first vehicle receives a response accordingly, and the interactive maneuver is initiated. At block 314 a determination is made that the first user of the first vehicle 702 and the second user of the second vehicle 704 do not agree that the interactive maneuver was successfully completed and that the resource, a spot in traffic, was successfully allocated to the first vehicle 702. At block 320, a determination is made that the first user of the first vehicle 702 and the second user of the second vehicle 704 do not agree that the interactive maneuver was unsuccessful.

At block 324, the first user of the first vehicle 702 decides whether or not to provide the incentive to the second user of the second vehicle 704. In making this determination, the first vehicle 202, in aspects, analyzes data shared by the second vehicle 204. If the data of the second vehicle 704 outweighs the data of the first vehicle 702, the incentive is provided. In alternative aspects, even if the data from the second vehicle 704 is weak, the first user of the first vehicle 702 may elect to always agree with the second user of the second vehicle 704 and send the incentive. In alternative or additional aspects, if the probability of an unsuccessful interactive maneuver calculated by the first vehicle 702 is greater than a threshold, then the incentive is not sent. If alternative or additional aspects, the average probability of a successful interactive maneuver is calculated by the first vehicle 702 and the second vehicle 704, and the average is then used to decide whether to send the incentive to the second vehicle 704.

At block 326, the first user of the first vehicle 702 assesses the willingness of the second user of the second vehicle 704 to perform the interactive maneuver as well as safety information if the interactive maneuver was initiated and rewards the second vehicle 704 with a report, which in aspects reflects the disagreement between the first user of the first vehicle 702 and the second user of the second vehicle 704 over whether the interactive maneuver was successfully performed. A user profile is then generated by the first vehicle 702, which may be shared with one or more third parties.

In further aspects, at block 326, the second user of the second vehicle 704 assesses the willingness of the first user of the first vehicle 702 to perform the interactive maneuver as well as safety information if the interactive maneuver was initiated and rewards the first vehicle 702 with a report, which in aspects reflects the disagreement between the second user of the second vehicle 704 and the first user of the first vehicle 702 over whether the interactive maneuver was successfully performed. A user profile is then generated by the second vehicle 704, which may be shared with one or more third parties.

It should be appreciated that the decisions and actions described above with reference to a first vehicle 202, 402, 502, 602, 702, and a second vehicle 204, 214, 404, 504, 604, 704, are alternatively or additionally made by the user of the respective vehicle. Thus, decisions in executing the methods herein may be made solely in the systems 100 of the respective vehicles 202, 204, 214, 402, 404, 502, 504, 602, 604, 702, 704 based on programmed threshold values, or decisions may alternatively or additionally made by the driver or an occupant.

Further, while the aspects above describe the use of the method relative to finding a spot in traffic in an adjacent lane, as noted above, the above method is applicable to other circumstances where a resource is needed by a first vehicle and is already in use by a second vehicle. Such circumstances include, for example, the use of a merging in front of the second vehicle, parking in a spot occupied by the second vehicle, passing the second vehicle, proceeding into a traffic circle, and entering an intersection.

It should further be appreciated that the rewards described herein include the safety reports and ratings that are formulated based on the assessment performed by the first vehicle 202, 402, 502, 602, 702 or the user thereof. In addition, in aspects, the second vehicle 204, 214, 404, 504, 604, 704 similarly rewards the first vehicle 202, 402, 502, 602, 702 or the user thereof and the reward is assigned in a similar manner to that of the first vehicle 202, 402, 502, 602, 702.

In aspects, data collected at blocks 312, 318 and 326 in the scenarios described above is collected by the systems 100 associated with one or both vehicles 202, 402, 502, 602, 702, 204, 214, 404, 504, 604, 704 and stored on-board the vehicle, on a server or in other storage 103. Further, the data collected by each vehicle may be shared with and stored by the other vehicle.

Data used for generating a user profile of the second user of the second vehicle 204, 214, 404, 504, 604, 704 collected by the first vehicle 202, 402, 502, 602, 702 includes, in aspects, if a request for performing an interactive maneuver at block 310 is accepted by the second vehicle 204, 214, 404, 504, 604, 704, an identifier of the second vehicle 204, 214, 404, 504, 604, 704 in addition to one or more of the following: the terms of the offer accepted; whether an incentive was requested and the amount of the incentive; whether the second vehicle 204, 214, 404, 504, 604, 704 followed through according to the first vehicle sensor data 202, 402, 502, 602, 702; how safely the second vehicle 204, 214, 404, 504, 604, 704 followed through with the interactive maneuver according to the first vehicle sensor data 202, 402, 502, 602, 702; if the second vehicle 204, 214, 404, 504, 604, 704 did not follow through with the interactive maneuver according to the first vehicle sensor data 202, 402, 502, 602, 702; what evidence was shared by the second vehicle 204, 214, 404, 504, 604, 704 if the first vehicle 202, 402, 502, 602, 702 determined that the second vehicle 204, 214, 404, 504, 604, 704 did not follow through with the interactive maneuver but claimed that it did; and in whose favor did the conflict resolution land.

Data used for generating a user profile of the first user of the first vehicle 202, 402, 502, 602, 072 collected by the second vehicle 204, 214, 404, 504, 604, 704 includes, in aspects, if a request for performing an interactive maneuver at block 310 is accepted by the first vehicle 202, 402, 502, 602, 702, an identifier of the first vehicle 202, 402, 502, 602, 702 in addition to one or more of the following: the terms of any incentive, if the second vehicle 204, 214, 404, 504, 604, 704 followed through with the interactive maneuver according to its owns sensors, whether the first vehicle 202, 402, 502, 602, 702 disagreed; if the second vehicle 204, 214, 404, 504, 604, 704 shared data with the first vehicle 202, 402, 502, 602, 702 on how the second vehicle 204, 214, 404, 504, 604, 704 concluded it followed through with the interactive maneuver, did the first vehicle 202, 402, 502, 602, 702 accept the data; and in whose favor did the conflict resolution land.

Further, as noted above, the data collected by the sensors 105 associated with each vehicle 202, 402, 502, 602, 702, 204, 214, 404, 504, 604, 704 is used, in aspects, to assess the safety of the interactive maneuver and generates a safety score to include in the user profiles. In one aspect, the safety evaluation of the interactive maneuver of the second vehicle 204, 214, 404, 504, 604, 704 is calculated according to the following formula, Eq. 1.

$$\text{Safety Score} = \alpha \times f_1(\min TTC) + \beta \times f_2(\max \text{lateral\_}acc) + \gamma \times f_3(\max \text{Longitudinal\_}acc) + \psi \times f_4(\text{gap\_created}) + \zeta \times f_5(\text{time\_gap\_created}) \quad \text{Eq 1.}$$

wherein $\alpha$, $\beta$, $\gamma$, $\psi$, and $\zeta$ are experimentally determined constants. f1 represents a function that increases as the minimum time to collision (minTTC) for the second vehicle to any other vehicle on the road increases. f2 represents a function that decreases as the lateral acceleration (max lateral_acc) experienced by the second vehicle increases. f3 represents a function that decreases as the longitudinal acceleration (max longitudinal_acc) experienced by the second vehicle increases. f4 represents a function that increases as the spatial gap created (gap_created) by the second vehicle between itself and the vehicle in front of it increases. f5 represents a function that increases as the time gap created (time_gap_created) by the second vehicle between itself and the vehicle in front of it increases. In aspects, additional factors may also be taken into account in calculating a safety score. In addition, or alternatively, non-linear operators may be used to calculate the final safety score in place of the weight linear operators described in Eq 1.

In one aspect, the safety evaluation of the interactive maneuver of the first vehicle 202, 402, 502, 602, 702 is calculated according to the following formula, Eq. 2.

$$\text{Safety Score} = \alpha \times f_1(\min TTC) + \beta \times f_2(\max \text{lateral\_}acc) + \gamma \times f_3(\max \text{Longitudinal\_}acc) + \psi \times f_4(\text{gap\_centering}) \quad \text{Eq 2.}$$

wherein $\alpha$, $\beta$, $\gamma$, and $\psi$ are experimentally determined constants. f1 represents a function that increases as the minimum time to collision (minTTC) for the first vehicle to any other vehicle on the road increases. f2 represents a function that decreases as the lateral acceleration (max lateral_acc) experienced by the first vehicle increases. f3 represents a function that decreases as the longitudinal acceleration (max longitudinal_acc) experienced by the first vehicle increases. f4 represents a function that decreases if the first vehicle uses the gap created for it in an asymmetric manner (gap_centering), i.e., if it leaves too much space in front while leaving less than a threshold amount of space behind itself or leaves too much space in the back and less than a threshold amount of space in the front and tailgating. In aspects, additional factors may also be taken into account in calculating a safety score. In addition, or alternatively, non-linear operators may be used to calculate the final safety score in place of the weight linear operators described in Eq 2.

In general, the systems and/or devices described herein may employ any of a number of computer operating systems, including, but by no means limited to, versions and/or varieties of the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices, including the controllers 101 described, generally include computer executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a controller 101 (e.g., a microprocessor) receives instructions, e.g., from a storage 103, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, methods, systems, methods, heuristics, etc. described herein, it should be understood that, although the steps of such methods, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain implementations and should in no way be construed so as to limit the claims.

Thus, the method and system herein provide various technical effects and benefits by the sharing of resources through the enabling of yielding decisions, conflict resolution and user profile generation. An advantage of the method and system include the comparison of collected data to verify the findings of each vehicle relative to whether an interactive maneuver was performed. A further advantage of the method and system include the provision of a safety rating of vehicles, their occupants, or both, which may be used for making further resource allocation decisions in the future. Yet, a further advantage of the method and system include incentivization of interactive maneuvers between vehicles in traffic.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of generating a user profile, comprising:
   determining by a first user of a first vehicle that an interactive maneuver is needed to provide a resource, wherein the first user is the first vehicle, and the first vehicle is a first autonomous vehicle, and the resource is a spot in traffic, and determining is based on one of the following: proximity to a destination, reduction of time to a destination, an identified need to stop the first vehicle, and a desired need to stop the first vehicle;
   identifying a second vehicle to interact with by referencing a user profile including a safety score for the second vehicle using a wireless interface circuit included in the first vehicle, wherein the second vehicle is movable from the resource to make the resource available for the first vehicle;
   contacting a second user of the second vehicle, using a wireless interface circuit included in the first vehicle, wherein the second user is the second vehicle and the second vehicle is a second autonomous vehicle;
   requesting the second user of the second vehicle to perform the interactive maneuver using the wireless interface circuit;
   receiving a response from the second user of the second vehicle using the wireless interface circuit;
   performing the interactive maneuver with the second vehicle;
   recording data with one or more sensors included in the first vehicle including speed of travel at the initiation and conclusion of the interactive maneuver, changes in acceleration, distances the first vehicle and the second vehicle in the direction of travel and cross-lane direction;
   calculating a safety score for the second vehicle from a minimum time to collision of the second vehicle to another vehicle, lateral acceleration of the second vehicle, longitudinal acceleration of the second vehicle, a spatial gap between the second vehicle and a vehicle traveling in front of the second vehicle, and a time gap between the second vehicle and the vehicle traveling in front of the second vehicle; and
   generating the user profile for the second user based on the performance of the interactive maneuver and providing the resource, wherein the user profile includes the safety score.

2. The method of claim 1, further comprising offering an incentive to the second user for performing the interactive maneuver.

3. The method of claim 2, wherein if the received response is negative, the method further comprises increasing the incentive.

4. The method of claim 2, wherein the first vehicle receives data collected by one or more sensors included in the second vehicle regarding how the first user performs the interactive maneuver.

5. The method of claim 4, further comprising determining if the first user and the second user agree that performance of the interactive maneuver was successful.

6. The method of claim 5, further comprising providing the incentive to the second user.

7. The method of claim 4, wherein the performance of the interactive maneuver was unsuccessful, and the method further comprises providing the incentive to the second user.

8. The method of claim 4, wherein the one or more sensors include a camera, lidar, radar, an ultrasonic sensor, a vehicle speed sensor, a vehicle system sensor, and a V2X based sensor.

9. The method of claim 8, further comprising reporting the user profile of the second user to a third party.

10. The method of claim 1, wherein the spot in traffic includes merging in front of the second vehicle for accessing an off ramp.

11. A system for generating a user profile, comprising:
    a controller in communication with a first vehicle wherein the first vehicle is an autonomous vehicle and includes one or more sensors and a wireless interface circuit, wherein the controller configured to execute instructions to:
    determine an interactive maneuver is needed to provide a resource, wherein resource is a spot in traffic, and determining is based on one of the following: proximity to a destination, reduction of time to a destination, an identified need to stop the first vehicle, and a desired need to stop the first vehicle;
    identify a second autonomous vehicle to interact with by referencing a user profile for the second autonomous vehicle including a safety score using a wireless interface circuit included in the first vehicle, wherein the second autonomous vehicle is movable from the resource to make the resource available for the first vehicle;
    contact the second autonomous vehicle, using the wireless interface circuit;
    request the second autonomous vehicle to perform the interactive maneuver using the wireless interface circuit;
    receive a response from the second user of the second autonomous vehicle using the wireless interface circuit;
    record data with one or more sensors included in the first vehicle including speed of travel at the initiation and conclusion of the interactive maneuver, changes in acceleration, distances the first vehicle and the second autonomous vehicle in the direction of travel and cross-lane direction;
    calculate the safety score for the second autonomous vehicle from a minimum time to collision of the second autonomous vehicle to another vehicle, lateral acceleration of the second autonomous vehicle, longitudinal acceleration of the second autonomous vehicle, and a spatial gap between the second autonomous vehicle and a vehicle traveling in front of the second autonomous vehicle, and a time gap between the second autonomous vehicle and the vehicle traveling in front of the second autonomous vehicle; and generate the user profile for the second autonomous vehicle based on the performance of the interactive maneuver and providing the resource, wherein the user profile includes the safety score.

12. The system of claim 11, the controller is further configured to execute instructions to offer an incentive to the second user for performing the interactive maneuver.

13. The system of claim 12, the controller is further configured to execute instructions to increase the incentive if the received response is negative.

14. The system of claim 12, wherein the controller receives data collected by one or more sensors included in the second autonomous vehicle regarding how the first vehicle performs the interactive maneuver.

15. The system of claim 14, wherein the controller is further configured to determine if a first user of the first vehicle and the second user of the second autonomous vehicle agree that performance the interactive maneuver was successful.

16. The system of claim 14, wherein the controller is further configured to determine if the performance of the interactive maneuver was unsuccessful and provide the incentive to the user of the second user.

17. The system of claim 11, wherein the controller is further configured to execute instructions to upload data on the performance of the interactive maneuver by the second user to a remote server.

18. The system of claim 17, wherein the controller is further configured to report the user profile to a third party.

19. The system of claim 11, wherein the spot in traffic includes merging in front of the second autonomous vehicle for accessing an off ramp.

20. A first autonomous vehicle including a system for generating a user profile, comprising:
   a controller;
   one or more sensors connected to the controller; and
   a wireless interface circuit connected to the controller, wherein the controller is configured to execute instructions to:

determine an interactive maneuver is needed to provide a resource based on one of the following: proximity to a destination, reduction of time to a destination, an identified need to stop the first vehicle, and a desired need to stop the first vehicle, and wherein the resource is a spot in traffic;

identify a second autonomous vehicle to interact with and reference a user profile including a safety score for the second autonomous vehicle using the wireless interface circuit included in the first vehicle, wherein the second autonomous vehicle is movable from the resource to make the resource available for the first vehicle;

contact the second autonomous vehicle, using the wireless interface circuit;

request the second autonomous vehicle to perform the interactive maneuver using the wireless interface circuit;

receive a response from the second autonomous vehicle using the wireless interface circuit; and record data with the one or more sensors included in the first vehicle including speed of travel at the initiation and conclusion of the interactive maneuver, changes in acceleration, distances the first vehicle and the second vehicle in the direction of travel and cross-lane direction;

calculate a safety score for the second autonomous vehicle from a minimum time to collision of the second autonomous vehicle to another vehicle, lateral acceleration of the second autonomous vehicle, longitudinal acceleration of the second autonomous vehicle, and a spatial gap between the second autonomous vehicle and a vehicle traveling in front of the second autonomous vehicle, and a time gap between the second autonomous vehicle and the vehicle traveling in front of the second vehicle; and generate the user profile for the second autonomous vehicle based on the performance of the interactive maneuver and providing the resource, wherein the user profile includes the safety score.

* * * * *